US009779266B2

(12) United States Patent
Nelke et al.

(10) Patent No.: US 9,779,266 B2
(45) Date of Patent: Oct. 3, 2017

(54) GENERATION OF ANALYSIS REPORTS USING TRUSTED AND PUBLIC DISTRIBUTED FILE SYSTEMS

(71) Applicant: International Business Machines Corporation, Armonk, NY (US)

(72) Inventors: Sebastian Nelke, Frickenhausen (DE); Martin A. Oberhofer, Bondorf (DE); Yannick Saillet, Stuttgart (DE); Jens Seifert, Gaertringen (DE)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 14/632,129

(22) Filed: Feb. 26, 2015

(65) Prior Publication Data

US 2015/0254474 A1    Sep. 10, 2015

(30) Foreign Application Priority Data

Mar. 4, 2014    (GB) .................................. 1403752.7

(51) Int. Cl.
*G06F 21/62*    (2013.01)

(52) U.S. Cl.
CPC ............................... *G06F 21/6254* (2013.01)

(58) Field of Classification Search
None
See application file for complete search history.

(56) References Cited

U.S. PATENT DOCUMENTS 8,321,469 B2    11/2012    Suereth et al.
8,533,254 B1 *    9/2013    Whitson, Jr.    ....... H04L 67/1095
                                                        709/203
(Continued)

FOREIGN PATENT DOCUMENTS

GB             2523761 A       9/2015
WO      2013153027 A1      10/2013

OTHER PUBLICATIONS

Chansler et al., "The Hadoop Distibuted File System," The Architecture of Open Source Applications, Mar. 15, 2012, Chapter 8, http://www.aosabook.org/en/hdfs.html, Accessed on Feb. 23, 2015.
(Continued)

*Primary Examiner* — Dede Zecher
*Assistant Examiner* — Richard A McCoy
(74) *Attorney, Agent, or Firm* — Reza Sarbakhsh

(57) ABSTRACT

The invention provides for a data processing system comprising an application server comprising at least one processor. Execution of the instructions cause the processor to: receive an analysis request, the analysis request comprising multiple data analysis commands for generating an analysis report descriptive of a structured data file; divide the commands into private analysis commands and public analysis commands; send the private analysis commands to a trusted distributed file system; send a portion of the public analysis commands to a public distributed file system; send a remainder of the public analysis commands to the trusted distributed file system; and generate the analysis report using public analysis results from the public distributed file system and trusted analysis results from the trusted distributed file system.

19 Claims, 4 Drawing Sheets

(56) References Cited

U.S. PATENT DOCUMENTS

| | | | |
|---|---|---|---|
| 2006/0155862 A1* | 7/2006 | Kathi | H04L 45/38 709/229 |
| 2011/0107358 A1* | 5/2011 | Shyam | G06F 9/5027 719/330 |
| 2012/0011149 A1 | 1/2012 | Zurek | |
| 2013/0091094 A1 | 4/2013 | Nelke et al. | |
| 2013/0132967 A1 | 5/2013 | Soundararajan et al. | |
| 2013/0282788 A1 | 10/2013 | Hylick et al. | |
| 2014/0108639 A1 | 4/2014 | Nelke et al. | |

OTHER PUBLICATIONS

Nelke et al., "Generation of analysis reports using trusted and public distributed file systems," Filed on Mar. 4, 2014, p. 1-37, UK Patent Application No. 1403752.7.

Wu et al., "Modeling of Distributed File Systems for Practical Performance Analysis," IEEE Transactions on Parallel and Distributed Systems, Jan. 2014, p. 156-166, vol. 25, No. 1, IEEE Computer Society.

UK Intellectual Property Office, "Search Report under Section 17(5)," Aug. 6, 2014, 3 Pages, International Application No. GB1403752.7.

\* cited by examiner

Table 200 - Table with clear value on trusted node:

| | CLIENTID | PROFESSION | GENDER | MARITAL_STATUS | BALANCE |
|---|---|---|---|---|---|
| 1 | 1326 | employee | F | married | 4,630.31 |
| 2 | 5324 | retired | M | divorced | 22,249.61 |
| 3 | 3231 | inactive | F | married | 1,712.23 |
| 4 | 3268 | employee | M | single | 3,580.00 |
| 5 | 6538 | employee | M | single | 1,273.86 |
| 6 | 7792 | inactive | F | child | 28.62 |
| 7 | 1204 | self-employed | F | single | 924.21 |
| 8 | 2221 | inactive | M | married | 9,990.00 |
| 9 | 9842 | retired | F | divorced | 7,398.00 |

Table 202 - Hashed table on public node:

| | CLIENTID | PROFESSION | GENDER | MARITAL_STATUS | BALANCE |
|---|---|---|---|---|---|
| 1 | #11 | #7 | #1 | #3 | #20 |
| 2 | #12 | #8 | #2 | #4 | #21 |
| 3 | #13 | #9 | #1 | #3 | #22 |
| 4 | #14 | #7 | #2 | #5 | #23 |
| 5 | #15 | #7 | #2 | #5 | #24 |
| 6 | #16 | #9 | #1 | #6 | #25 |
| 7 | #17 | #10 | #1 | #5 | #26 |
| 8 | #18 | #9 | #2 | #3 | #27 |
| 9 | #19 | #8 | #1 | #4 | #28 |

Table 204 - Hash map:

| Hash | Value | Hash | Value | Hash | Value |
|---|---|---|---|---|---|
| #1 | F | #10 | 1326 | #19 | 9842 |
| #2 | M | #11 | 5324 | #20 | 4,630.31 |
| #3 | married | #12 | 3231 | #21 | 22,249.61 |
| #4 | divorced | #13 | 3268 | #22 | 1,712.23 |
| #5 | single | #14 | 6538 | #23 | 3,580.00 |
| #6 | child | #15 | 7792 | #24 | 1,273.86 |
| #7 | employee | #16 | 1204 | #25 | 28.62 |
| #8 | retired | #17 | 2221 | #26 | 924.21 |
| #9 | inactive | #18 | self-employed | #27 | 9,990.00 |

FIG. 2

GENERATION OF ANALYSIS REPORTS USING TRUSTED AND PUBLIC DISTRIBUTED FILE SYSTEMS

BACKGROUND

The invention relates to the analysis or structured data files, in particular to the use of multiple distributed file systems to analyze the data files.

A fundamental concern about moving corporate data into public cloud environments is the data security. This problem is also applicable for information integration techniques such as data analysis and data profiling.

SUMMARY

The invention provides for a data processing system, a method of operating a data processing system, and a computer-readable storage medium in the independent claims. Embodiments are given in the dependent claims.

In one aspect the invention provides for a data processing system comprising an application server. The application server comprises at least one application server processor. The application server further comprises a memory for storing machine-executable instructions. Execution of the machine-executable instructions causes the application server processor to receive an analysis request. The analysis request comprises multiple data analysis commands for generating an analysis report descriptive of a structured data file. Execution of the instructions further causes the application server processor to divide the multiple data analysis commands into private analysis commands and public analysis commands. Execution of the instructions further causes the application server processor to send the private analysis commands to a trusted distributed file system. A distributed file system as used herein comprises a network of computers or computing nodes which have storage capacity and computational capacity divided between different nodes. A trusted distributed file system as used herein encompasses a distributed file system. The label 'trusted' is an adjective used to indicate a particular distributed file system. Execution of the machine-executable instructions further causes the application server processor to send a portion of the public analysis commands to a public distributed file system. A public distributed file system as used herein encompasses a distributed file system. The label 'public' is an adjective used to indicate a particular distributed file system.

Execution of the machine-executable instructions further causes the application server processor to send a remainder of the public analysis commands trusted distributed file system. The remainder is the public analysis commands which are not in the portion. The private analysis commands are all sent to the trusted distributed file system. The public analysis commands are split between the public distributed file system and the trusted distributed file system. Execution of the machine-executable instructions further causes the application server processor to receive public analysis results from the public distributed file system. Execution of the instructions further causes the application server processor to receive trusted analysis results from the trusted distributed file system. Execution of the instructions further causes the application server processor to generate the analysis report using the public analysis results and the trusted analysis results.

BRIEF DESCRIPTION OF THE SEVERAL VIEWS OF THE DRAWINGS

In the following, preferred embodiments of the invention will be described in greater detail by way of example only making reference to the drawings in which:

FIG. 2 illustrates an example of several structured data files;

DETAILED DESCRIPTION

Figure 1:
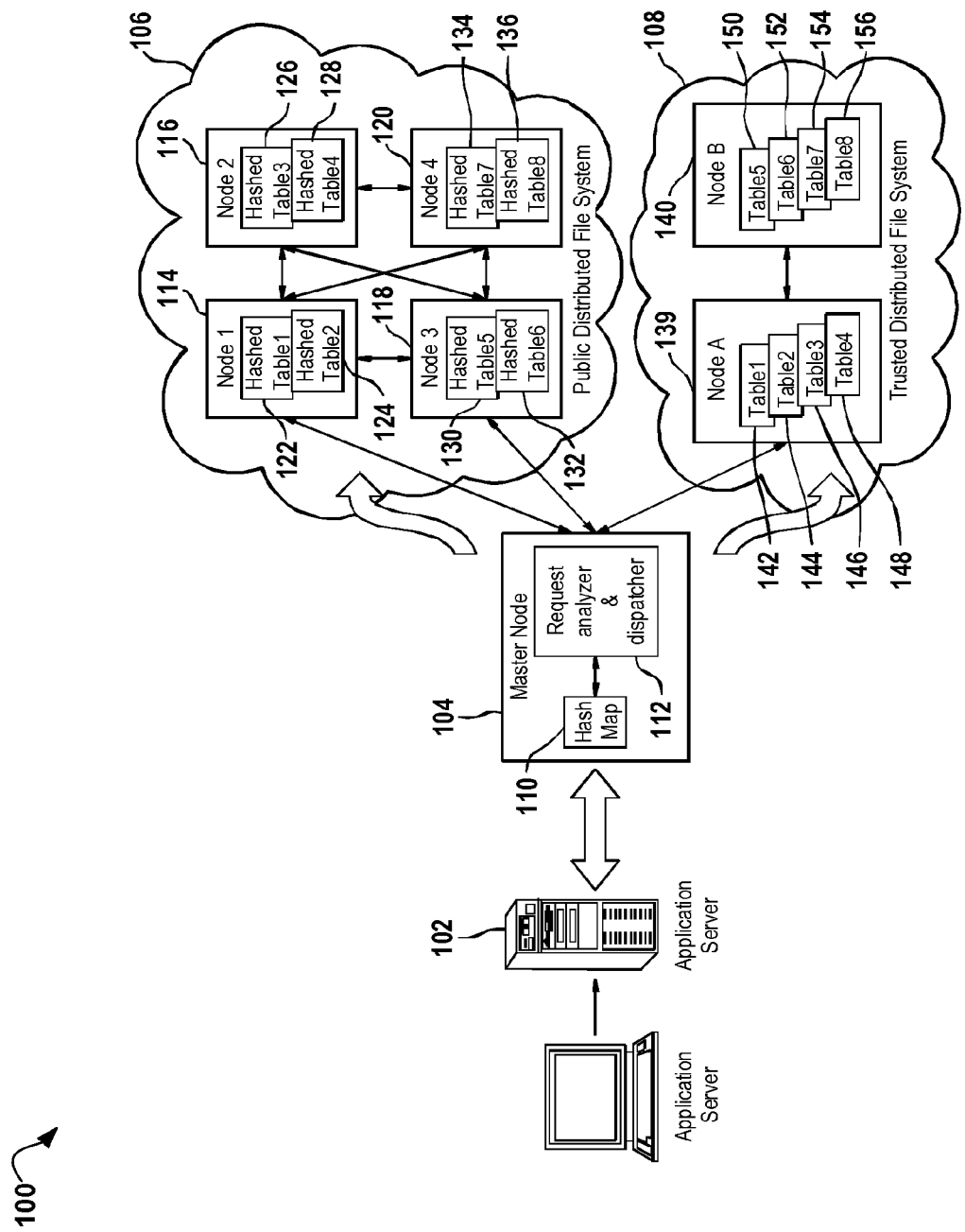
FIG. 1 illustrates an example of a data processing system.

In the following, like numbered elements in these figures are either similar elements or perform an equivalent function. Elements which have been discussed previously will not necessarily be discussed in later figures if the function is equivalent.

As will be appreciated by one skilled in the art, aspects of the present invention may be embodied as an apparatus, method or computer program product. Accordingly, aspects of the present invention may take the form of an entirely hardware example, an entirely software example (including firmware, resident software, micro-code, etc.) or an example combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some examples, a computer-readable storage medium may also be able to store data which is able to be accessed by the processor of the computing device.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some examples computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to examples of the invention. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In one example, a data processing system comprises an application server. The application server comprises at least one application server processor. An application server processor as used herein is a processor. The application server further comprises a memory for storing machine-executable instructions. The machine-executable instructions may also be referred to as instructions herein. Execution of the instructions causes the application server processor to receive an analysis request. The analysis request may for instance be received via a computer network from another computer system. The analysis request comprises multiple data analysis commands for generating an analysis report descriptive of a structured data file. The analysis request is a detailed set of instructions which enable the processor to analyze the structured data file and compile or generate the analysis report. The structured data file may be a data file which contains data elements that have a predetermined structure or format. For instance a structured data file may include, but is not limited to: a database, a relational database, a comma separated value file, a text file, and a spreadsheet.

Execution of the instructions further causes the application server processor to divide the multiple data analysis commands into private analysis commands and to public analysis commands. A private analysis command as used herein encompasses a command. A public analysis command as used herein encompasses a command. Execution of the instructions further causes the application server processor to send the private analysis commands to a trusted distributed file system. Execution of the instructions further causes the application server processor to send a portion of the public analysis commands to a public distributed file system. Execution of the instructions further causes the application server processor to send the remainder of the public analysis commands that are not a part of the portion of the public analysis commands to the trusted distributed file system.

The sending and receiving of data between the processor and the trusted distributed file system may be via a computer network. The sending and receiving of data between the processor and the public distributed file system may also be via a computer network.

The private analysis commands are commands which may only be executed or sent to the trusted distributed file system. The public analysis commands may be executed or sent to the public distributed file system or the trusted distributed file system. Execution of the instructions further causes the application server processor to receive public analysis results from the public distributed file system. The public analysis results are the result of the public distributed file system executing the portion of the public analysis commands.

Execution of the instructions further causes the application server processor to receive trusted analysis results from the trusted distributed file system. The trusted analysis results are the results or the data resulting from the trusted distributed file system executing the private analysis commands and the remainder of the public analysis commands. Execution of the instructions further causes the application server processor to generate the analysis report using the public analysis results and the trusted analysis results. For instance the application server processor may compile the public analysis results and the trusted analysis results into the analysis report. This example may have the benefit that the data processing system may more efficiently use external or public distributed file systems for performing the analysis request. For example in some examples the trusted distributed file system may belong to a particular company or group. They may have a need to produce an analysis report descriptive of the structured data file, however they may lack the computational or storage power to perform generation of the analysis report in a prompt manner. The example provides the means to integrate a public distributed file system into the analysis process of analyzing the structured data file.

In one example the application server is a battery powered computer. In one example the application server is a mobile computing device. In one example the application server is a mobile telecommunications device, i.e., a smart phone or a tablet computer.

In another example, the public distributed file system contains an anonymized copy of the structured data. Anonymizing a copy of the structured data file as used herein encompasses scrambling or encrypting a portion of a structured data file so that those anonymized portions of the data file cannot be understood or interpreted by a third party. The structured data file comprises data elements. The anonymized copy is a copy of the structured data file with an anonymizing function applied to at least a subset of the data elements. The anonymizing function is applied to individual data elements within the structured data file. This has the benefit of putting the structured data file in a format which is not able to be read or interpreted by a public third party. However, because the anonymization is applied on a per data element basis it still enables some analysis of the individual data elements.

The anonymizing function is a deterministic function that always has the same output for the same input. In this way it can be anonymized and then for instance searches or the frequency of a particular string or set of characters can be analyzed by the public distributed file system. If a public third party gains access to the anonymized copy of the structured data file it is of no consequence because the sensitive portions have been anonymized using an anonymizing function.

In another example, execution of the instructions further causes the application server processor to select the subset of the data elements using any one of the following: a mask, a classification of the data elements, a predetermined criteria, and combinations thereof. For instance a program can be set up to automatically look at individual data elements and apply the analyzing function such that the data cannot be interpreted by a third party. This for instance could be set up using the mask which may use the particular location of a data element within the structured data file, it may look at how the data elements classified within the structured data element or even a predetermined character such as key strings.

In another example, the anonymizing function is a hash function. In another example the anonymizing function is a public/private key pair encryption algorithm. In another example the anonymizing function is a symmetric encryption algorithm. In another example the anonymizing function is an order preserving hash function. In another example the anonymizing function is a dictionary index. In another example the anonymizing function is a homomorphic encryption algorithm.

In another example, execution of the instructions further causes the application server processor to create the anonymized copy by applying the anonymizing function to at least a subset of the data elements. Execution of the instructions further causes the application server processor to send the anonymized copy of the structured data file to the public distributed file system. For instance the anonymizing function may use any one of the aforementioned methods of selecting the subset of data elements to which to apply the anonymizing function to.

In another example, execution of the instructions further causes the processor to consolidate the public analysis results and the trusted analysis results before generating the analysis report. For example the trusted and public analysis results can be collected in the trusted distributed file system. In other examples the public and trusted analysis results are collected in or by the application server. In some examples the application server is a part of the trusted distributed file system. In other examples the trusted distributed file system is separate from the application server.

In another example, the public analysis results comprise anonymized report data elements. Execution of the instructions further causes the processor to reverse anonymization of the anonymized report data elements before generating the analysis report. For example if the public distributed file system executed a command to search for the most common string it may return a string which has been processed by an anonymizing function. The instructions cause the processor to reverse the anonymization such that when the analysis report is produced values have their original structure and may be intelligible. If the anonymizing function is an encryption algorithm then the elements may be unencrypted. If a hash function or other similar function is used during the anonymization process the processor may store a lookup table so the values can be converted, translated, or decrypted to their original value later. The lookup table could be stored by the clustered distributed file system and/or the application server.

In another example, execution of the instructions further causes the application server processor to receive a public system load message from the public distributed file system. Execution of the instructions further causes the application server processor to receive a trusted system load message from the trusted distributed file system. Execution of the instructions further causes the application server processor to select the portion of the public analysis commands using the public system load message and the trusted system load message. The public system load message and the trusted system load message are load messages. The load messages as used herein are descriptive of the usage of computational resources of the trusted distributed file system and the public distributed file system. By knowing how much of the computational load or capacity the public and the trusted distributed file system have an efficient distribution of the public analysis commands to each file system. This may enable a more rapid generation of the analysis report.

In another example, the public analysis commands comprise any one of the following: an equality check, an order comparison, a determination of cardinality, a determination of a number of distinct values, a determination of a number of occurrences of a value, a counting operation, a sorting operation, a find primary key column operation both simple and compound, a find duplicate rows operation, a strict find duplicate rows operation, a fuzzy find duplicate rows operation and combinations thereof. In another example the data processing system further comprises the trusted distributed file system and/or the public distributed file system.

In another example, the private analysis commands comprise any one of the following: a public analysis command as defined above, determination of the minimum value, a determination of a maximum value, an order comparison, an arithmetic operation, a regular expression check, a format check, an inferred data type check, an outlier detection, a transformation function, a sorting operation, and combinations thereof.

In another example, the analysis request is a metadata analysis request. The analysis report is a metadata profile. A metadata profile as used herein is a profile containing metadata which is descriptive of the structure of the structured data file. For instance the structured data file could be a relational or other database which is being used on a legacy system. There may not be a description of the data which enables the data to be migrated to a new system. The metadata analysis request contains commands which generate the metadata profile which would then be useful for migrating the database system to a new database system.

In another example, the analysis request is descriptive of data elements matching at least a predetermined criterion. The predetermined criterion or criteria may be a list of conditional statements or a description of the structured data file which are being searched for.

In another example, execution of the instructions further causes the processor to divide the multiple data analysis commands into the private analysis commands and the public analysis commands by determining a location in the structured data elements specified by each of the multiple data analysis commands. The location determines if the data element is anonymized in the public distributed file system. The commands are further divided by the processor when the commands are executed by assigning a data analysis command to the public analysis commands if the location of the data analysis command indicates that the data analysis element is not anonymized.

Execution of the instructions further causes the processor to assign the data analysis commands to the public analysis commands if the location of the data analysis command indicates that the data element is anonymized and the data analysis command is able to analyze the anonymized data. Execution of the instructions further causes the processor to assign the data analysis command to the private analysis commands if the location of the data analysis command indicates that the data element is anonymized and the data analysis command is unable to analyze the anonymized data.

As a concrete example, for instance in a columnar database entire columns may be specified by a template to have the anonymizing function applied to them. The knowledge that a particular column is going to be anonymized may be used in combination with the particular type of data analysis command to determine if the data analysis command should be a public or private analysis command.

In another example, there is a method of operating a data processing system comprising an application server defined by the machine executable instructions.

In another example, a computer-readable storage medium contains the machine executable instructions.

In some examples, not all of the structured data file needs to have data which is protected. That is to say some of the data elements may contain sensitive data and others may not. It is only needed to encrypt or anonymize data which are considered to be sensitive. The public distributed file system may contain non-sensitive data elements in clear text. This may extend the portion of the analysis that can be done by the public distributed file system. In some examples the analysis request could specify select queries searching for data matching a particular condition.

In another example when the analysis request is received it is first analyzed to find out what kind of operation is executed on which columns or portions or data elements of the structured data file. Next it may be checked where the columns in the execution plan are located. They may for example be unencrypted in a private node but can also be encrypted or anonymized on a public node. If the columns for a particular analysis step are unencrypted on a public node that step may be equally executed either on a public distributed file system or a trusted distributed file system containing the data. If the columns of the data file for a particular analysis are available to the trusted distributed file system, but only in an anonymized form the system may check if that analysis can be run using the anonymized data. If this is the case it may be chosen either to be executed by the public distributed file system or the trusted distributed file system. Once all of the analysis requests have been executed the results from all of the analysis steps are consolidated together in for example a private node to prepare the analysis report. During this process the encrypted or anonymized data coming from the public distributed file system may also be unencrypted or un-anonymized if the result to present to the user requires the showing of real values.

Examples may provide for better security when using public cloud environments. First, metadata may be exploited to understand which data profiling tasks work on encrypted data—examples would be domain analysis, foreign key detection, etc. This metadata is combined with metadata about which data profiling tasks are particularly resource intense (e.g. compound key detection). Exploiting this metadata allows to optimize the placement of data analysis tasks for maximum performance while not breaching data security.

Examples of data systems may have one or more of the following advantages:
 Ability to distribute data analysis work across heterogeneous node sets comprised of trusted nodes and public or un-trusted nodes
  In known systems, it's an either/or decision which means the analysis job is either in the trusted or the public environment—but never across both
 Ability to perform data profiling on encrypted data
 Ability to perform this completely transparent for the user
 Ability to identify and move specifically move sensitive & resource hungry tasks into appropriate combinations of compute nodes with members from the trusted and public node set.

Examples of data processing systems may incorporate one or more of the following features:
 Intelligent Profiling job distributor performing job analysis and job dispatching by placing the profiling task into the right environment. This may include the possibility to place the jobs into a combination of trusted and public nodes
 This distribution happens transparently to the user
 As ingredients for the decision making, the following may be beneficial: metadata catalog which profiling tasks work on encrypted data, metadata catalog which profiling tasks are particularly resource hungry, operational monitoring providing insight into resource utilization of the compute nodes, key traction dictionary to know which unencrypted row belongs to which key row.

Examples of data processing systems may have one or more of the following benefits:
 Optimize the performance of data analysis or data profiling, by maximizing the ability of using cheap, or public compute nodes for data profiling for profiling tasks able to run on encrypted data—runtime can be substantially improved.
 Ability to perform data profiling in the public (untrusted) cloud computer nodes in a secure manner on sensitive data by distributing a job across trusted and public nodes
 Ability to do data profiling job distribution considering data security requirements in a manner which is transparent to the end user reducing cost and time.
 Optimize resource utilization: Usually the IT resources in the untrusted or public environment, e.g., public cloud like Amazon, are substantially larger then in-house capacity. Pushing all profiling tasks which work on encrypted data to public environments improves available capacity for data profiling which needs to run on unencrypted, sensitive data on trusted nodes.

FIG. 1 shows an example of a data processing system 100. The data processing system 100 comprises an application server 102. The application server is connected to a master node 104. A node may also be referred to as a computational resource or computer in some instances. The master node is connected to a public distributed file system 106. The master node 104 is also connected to a trusted distributed file system 108. The master node 104 comprises a module with a hash map 110. The hash map 110 is able to apply an anonymizing function to an element of a structured data file. The master node 104 also comprises a module which is able to analyze analysis request and dispatch various data analysis commands to either the public distributed file system 106 or the trusted distributed file system 108. The public distributed file system contains a number of computational nodes. These are shown as node 1 114, node 2 116, node 3 118, and node 4 120. The node 1 114 contains hashed table 1 122 and hashed table 2 124. Node 2 116 comprises hashed table 3 126 and hashed table 4 128. Node 3 118 contains hashed table 5 130 and hashed table 6 132. Node 4 120 contains hashed table 7 134 and hashed table 8 136. The hashed tables 122, 124, 126, 128, 130, 132, 134, 136 make up a copy of the structured data file which has been anonymized. The trusted distributed file system 108 is shown as containing computational node a 138 and computational node b 140. Computational node a is shown as having table 1 142, table 2 144, table 3 146 and table 4 148. Node b 140 is shown as having table 5 150, table 6 152, table 7 154, and table 8 156. These data tables 142, 144, 146, 148, 150, 152, 154, 156 make up an unencrypted or un-anonymized copy of the structured data file. In some examples, the master node 104 may be a component or part of the application server 102. In other examples the master node 104 may be incorporated into the trusted distributed file system. In other examples the application server itself 102 is also a portion of the trusted distributed file system.

In operating the data processing system 100 shown in FIG. 1 first an analysis job or analysis request is submitted to the application server. Next the system checks if the analysis job requires an unencrypted value or can be run using hashed values. If an analysis can be run on hashed values or encrypted values the job is pushed to the nodes 114, 116, 118, 120 of the public distributed file system 106. For example if there is key analysis, uniqueness check, or rules that use strict comparisons then a job can be performed by the nodes 114, 116, 118, 120 of the public distributed file system 106.

If a particular analysis requires unencrypted values the job is pushed to the nodes 138 and 140 of the trusted distributed file system 108. These jobs may for example be a regular expression, a format analysis, and rules using arithmetic, range check and other such operations.

After all data analysis commands have been completed, a return analysis results or the analysis report is returned by the application server. If the analysis ran on hash or encrypted values, the hash map may be used to replace the hash values or the real values before returning the result. If the values were encrypted then the values may be unencrypted before the result is returned.

FIG. 1 shows the solution architecture of this invention which is based on a set of cloud environments based on distributed compute infrastructure—one example being Hadoop. The different cloud environments are categorized in trusted and public (un-trusted) where public could be a public cloud or a cloud cluster in a non-trusted compute area in the corporate data center. In addition, the data is stored at least twice: once unencrypted on trusted nodes and once encrypted on public nodes.

If space permits—in both areas multiple copies can be stored to maximize parallel execution. Also note that the invention can work on table (relational) structures as well as columnar structures—the later during load improving compression and providing key relevant metrics such as frequency distribution automatically without a need for any profiling task to do this. That being said, we don't want to limit this invention to either one of the two structural approaches.

One possible method of operating an example of a data processing system is: A user requests a data profiling task so that an analysis job is submitted. An intelligent profiling job distributor performs then an analysis if:
  The requested analysis job works on encrypted data
  The requested analysis job is resource hungry.
Based on the analysis, the analysis job is:
  placed in the public nodes area if the profiling job can run on encrypted data or
  placed into the public nodes area if the profiling job requires unencrypted data
  Placed in both environments.
    e.g. column analysis with uniqueness check and format analysis could be split to determine uniqueness (works on encrypted data) in the public nodes set and the format analysis (requires original data) in the trusted node set.
    e.g. if columnar structures are used to manage data on the nodes the split can be done on per column basis per operation in the profiling task.
  If there are multiple compute node clusters, the resource demand of the new profiling tasks is assessed against the available free capacity and submitted to a cluster which has the required resources available.

Once the results are computed, the results are returned. If the analysis ran on encrypted data, the key extraction dictionary or clear value dictionary (cf. the hash map 204 in FIG. 2 for an example) is used to replace the encrypted data values with the real values so that the user can more seamlessly understand the results.

Metadata profiling tasks compatibility with encryption:
  The following profiling tasks work on encrypted data (list by example only): uniqueness analysis, Primary Key (PK) analysis, domain analysis, cross domain analysis, and rules with strict comparisons.
  The following profiling tasks do not work on encrypted data (list by example only): regular expressions, format analysis, rules with arithmetic, and range checks.

Metadata for profiling tasks regarding resource requirements:
  The following profiling tasks require are very resource intensive (list by example only): cross domain analysis and multi-column key detection.
  The following profiling tasks only require moderate resources (list by example only): domain analysis and column analysis.

FIG. 2 shows an example of a structured data file 200. In this case the structured data file 200 is a table with clear or unencrypted values. The table 200 could be stored on the trusted distributed file system. Table 202 is an example of an anonymized data file 202. 202 is the table 200 after the data elements have been individually passed through a hash function. The table 204 is an example of a hash map. This is a translation between various values in the table 200 and the hashed table 202. When compiling the analysis report it may be beneficial to convert values from the hash value back into the original value.

The key extraction dictionary or hash map 204 as shown in FIG. 2 is created during initial load of the data into the profiling environment. The hash map as shown tracks the keys between the data stored unencrypted on trusted nodes and the data in its encrypted fashion on public node. Per table in the profiling environment such a hash map is created—thus the key traction dictionary is comprised of a series of hash maps.

In one example, the data model for the incoming data might be tagged indicating which fields are sensitive and which ones are not. A configuration parameter might then be used to avoid encryption for the non-sensitive fields while upload to the public nodes is done improving load time making the data faster available for analysis (but exposing it to possible breach).

The workload management might have several variations as well, for example: As long as the in house, trusted node infrastructure is less than 30% utilized new data for analysis is placed on the in house trusted node set and analyzed there right away.

In one example, there is a method to distribute data analysis jobs to maximize the utilization of a combination of trusted and not trusted nodes while preserving the confidentiality of data by encrypting the data on the non-trusted nodes.

In another example, in the method the analyzed data is copied both on the trusted nodes in an unencrypted form and on the non-trusted form in an encrypted form.

In another example, the encryption method implies replacing the values by hash codes and storing on the master node or a trusted node a map giving the correspondence between the hash codes on the non-trusted nodes and the unencrypted values on the trusted nodes.

In another example, the analysis jobs are checked whether they can run on the encrypted values or require unencrypted values to return a correct result, and where jobs which can run on encrypted values are sent by preference on non-trusted nodes, depending on their availability, to keep the trusted nodes free for jobs requiring unencrypted values.

In another example, the encrypted result returned by jobs running on non-trusted nodes are replaced by their unencrypted equivalent by a trusted node before the result is presented to the user.

In another example, an analysis job can be split in subtasks, some of these tasks being directed on trusted nodes, while some other tasks are directed on non-trusted nodes.

In another example the decision whether a job should run on a trusted or non-trusted node is also dependent on the expected resource consumption of the job and the current utilization of the nodes.

In another example only parts of the data are marked as being sensitive and only those sensitive parts are encrypted on non-trusted nodes. Jobs that require non encrypted data but only run on non-sensitive columns can then be directed to non-trusted nodes.

Figure 3:
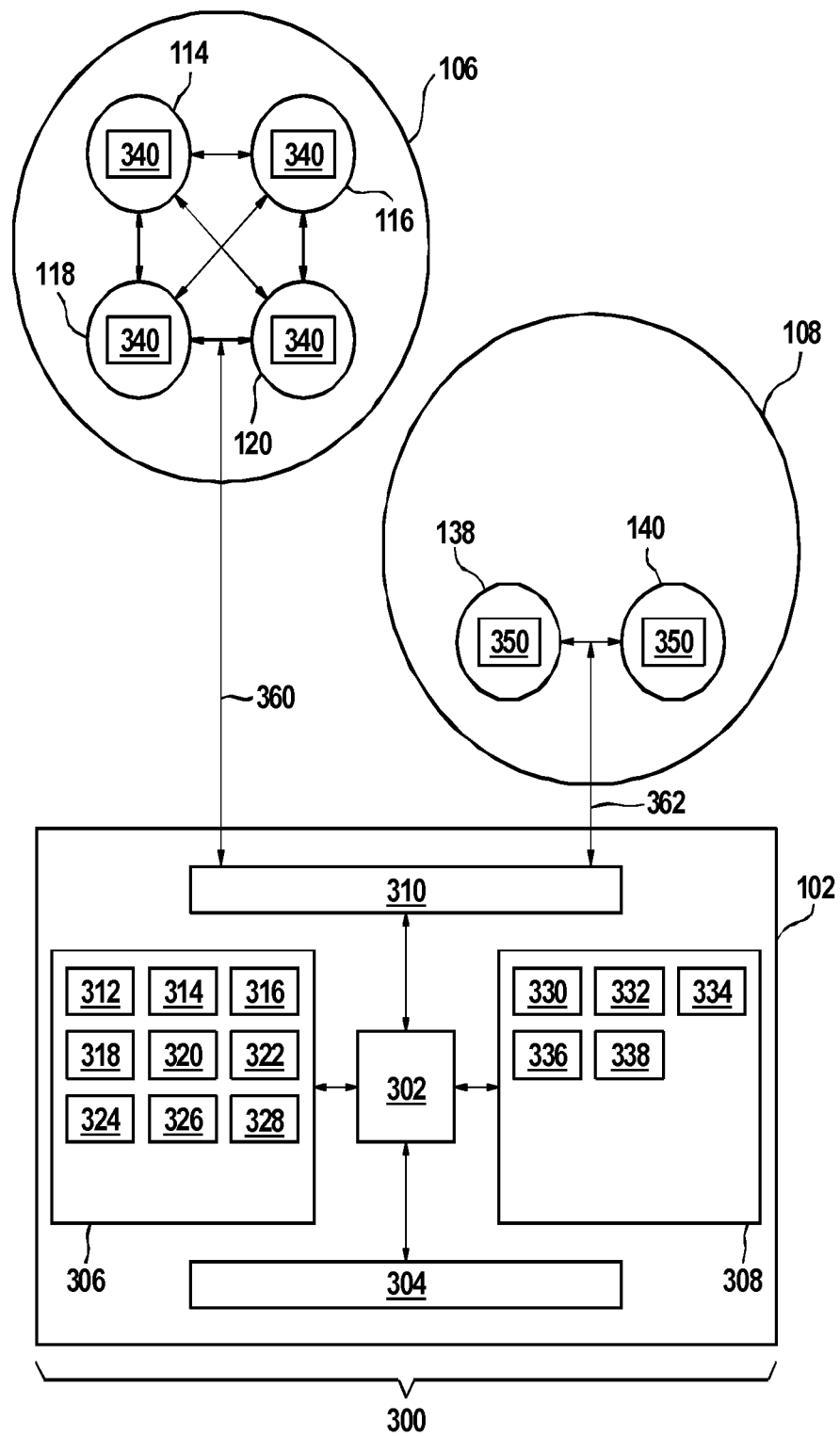
FIG. 3 illustrates a further example of a data processing system.

FIG. 3 shows a further example of a data processing system 300. The data processing system again contains an application server 102 which is connected to a public distributed file system 106 and a trusted distributed file system 108. The application server 102 is a computer which comprises at least one application server processor 302. The application server processor 302 is shown as being connected to an optional user interface 304 and being connected to computer storage 306 and computer memory 308. The application server processor 302 is further shown as being connected to a network interface 310 which allows it to connect with the public distributed file system 106 and the trusted distributed file system 108.

The computer storage 308 is shown as containing a structured data file 312. The computer storage 308 is further shown as containing an analysis request 314. The computer storage is further shown as containing private analysis commands 316 and public analysis commands 318. The analysis request 314 has been divided into the private analysis commands 316 and the public analysis commands 318. The computer storage 308 is further shown as containing a public system load message 320 and a trusted system load message 322. The two load messages 320, 322 are descriptive of how used the computational resources of the distributed file systems 106, 108 are.

The public system load message 320 and the trusted system load message 322 are used to divide the public analysis commands 318 into the portion of public analysis commands 320 and the remainder of the public analysis commands 322, both of which are shown as being stored in the computer storage 306. The portion of the public analysis commands are for execution by the public distributed file system 106. The remainder of public analysis commands 322 are for execution by the trusted distributed file system 108. The computer storage 306 is shown as containing public analysis results 324 received from the public distributed file system 106 after it has executed the portion of the public analysis commands 320. The computer storage 306 is further shown as containing trusted analysis results 326 that were received from the trusted distributed file system 108 after the private analysis commands 316 and the remainder of public analysis commands 322 were executed. The computer storage 306 is further shown as containing an analysis report 328 that was constructed or generated using the public analysis results 324 and the trusted analysis results 326.

The computer memory 308 is showing a number of executable software modules for execution by the processor 302. The contents of the computer storage 306 and the computer memory 308 may be interchangeable. That is to say some items may be stored in both 306 and 308 or may be exchanged between the two.

The computer memory 308 is shown as containing a data anonymization module 330. The data anonymization module 330 contains computer-executable code which enables the processor 302 to anonymize at least a portion of the structured data file 312. The module 330 may contain other data which enables it to selectively anonymize data elements or a portion of the structured data file 312. For instance the module 330 may have such things as logical conditions, templates, or strings which are to be anonymized. The computer memory 308 is further shown as containing a data command divider module 332. The data command divider module 332 contains computer-executable code which enables the processor 302 to divide the analysis request 314 into private analysis commands 316 and public analysis commands 318. This division of the analysis commands 316, 318 may be performed using the type of the analysis command also in conjunction with whether a particular data element which the data analysis command operates on has been anonymized or not.

The computer memory 308 is further shown as containing a load distribution module 334. The load distribution module 334 contains computer-executable code which enables the processor 302 to divide the public analysis commands 318 into the portion of public analysis commands 320 and the remainder of the public analysis commands 322 using the public system load message 320 and the trusted system load message 322. The computer memory 308 is further shown as containing a de-anonymizing module 336. The de-anonymizing module 336 contains code or data which may enable the processor 302 to translate the public analysis results 324 back into clear text. The module 336 for instance may be for decrypting portions of the public analysis results 324 or it may also be for providing a hash table which enables the processor 302 to look up clear values of the text. The computer memory 308 is further shown as containing a report generation module 338. The report generation module 338 contains code 302 which enables the processor 302 to construct the analysis report 328 using the public analysis results 324 and the trusted analysis results 326.

As was shown in FIG. 1 the public distributed file system 106 contains computational nodes 114, 116, 118 and 120. These computational nodes 114, 116, 118, 120 are shown as containing the anonymized structured data file 340. The anonymized structured data file 340 may be broken up and stored individually on the computational nodes 114, 116, 118, 120 or they may each have an individual copy of the anonymized structured data file 340. Block 340 is intended to either represent the entire anonymized structured data file or only a portion of it which is broken apart among the different computational nodes 114, 116, 118, 120.

Also as was shown in FIG. 1 the processing system 300 comprises a trusted distributed file system 108 with computational nodes 138 and 140. The computation nodes 138 and 140 are shown as having a structured data file 350. The structured data file 350 may represent each a copy of the structured data file 312 or the structured data file 312 may be broken into individual pieces which are stored in different computational nodes 138, 140. The structure of the computational nodes in the two distributed file systems 106, 108 is intended to be representative and each of the distributed file systems 106, 108 may have more or fewer computational nodes. The application server 102 may also in some cases be a computational node of the trusted distributed file system 108.

The application server 102 communicates with the public distributed file system via network connection 360. The application server 102 communicates with the trusted distributed file system via network connection 362. Computational nodes within each of the distributed file systems 106, 108 communicated between each other using network connections.

Figure 4:
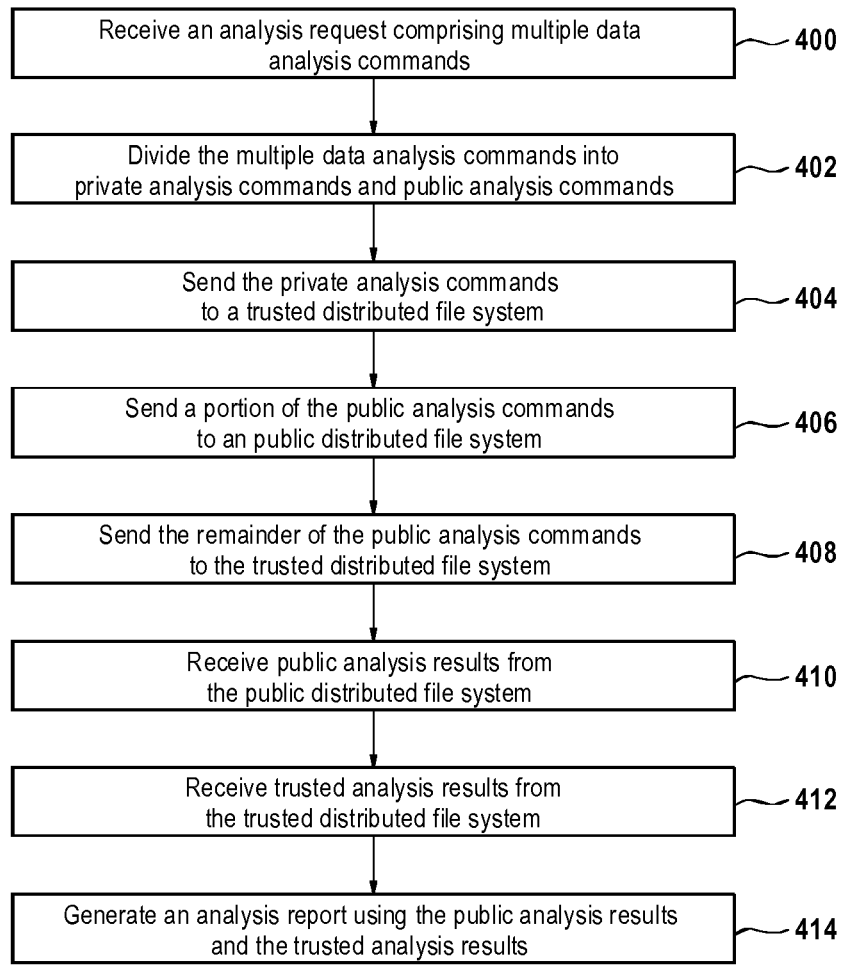
FIG. 4 illustrates a example of a method of operating the data processing system of FIG. 3.

FIG. 4 shows a flowchart which illustrates an example of a method of operating the data processing system 300 of FIG. 3. First in step 400 an analysis request 314 is received. The analysis request comprises multiple data analysis commands for generating an analysis report 328 which is descriptive of the structured data file 312. Next in step 402 the multiple data analysis commands are divided into the private analysis commands 316 and the public analysis commands 318. Then in step 402 the private analysis commands are sent to the trusted distributed file system 108. In step 406 the portion of the public analysis commands 320 are sent to the public distributed file system 106. Then in step 408 the remainder of the public analysis commands 322 are sent to the trusted distributed file system 108. Next in step 410 the application server receives the public analysis results 324 from the public distributed file system 106. In step 412 the trusted analysis results 326 are received from the trusted distributed file system 106. Finally in step 414 the analysis report 328 is generated using the public analysis results 324 and the trusted analysis results 326.

An analysis request or job may be divided into multiple data analysis commands that can be executed partially on the trusted distributed file system and the public distributed file system.

An example where an analysis request is run both on the trusted and the public distributed file system instead of just a choice of one is when a table contains a column COUNTRY and a column PHONE_NUMBER. One rule that the data must verify could be: IF COUNTRY='FRANCE' THEN PHONE_NUMBER matches_format '99.99.99.99.99' indicating that a French phone number should always have 10 digits.

In that case, the test searching for all rows where COUNTRY='FRANCE' could be done on the hashes stored on the public nodes, since it only requires a string comparison, and the test searching which of those rows do not match the 10 digits format would be done on the trusted nodes because it requires the clear text values.

Another example is for a column analysis process. In this example, the analysis first requires computing the counting of all the distinct values of a column and gathering all kind of statistics, such as the minimum, maximum, general format, inferred type, cardinality, and etc.

Computing the number of occurrences of the distinct values, the cardinality and whether it is a primary key candidate can be done on the untrusted or public nodes for all columns. The computation of the inferred type or general format would be done, for sensitive data, only on the trusted nodes, and, for non-sensitive data, on any node holding the clear text values. At the end the application would gather the results of both trusted (trusted analysis results) and public nodes (public analysis result) and present a consistent result to the user in the form of a combined analysis report.

The following table outlines, for the purpose of example, a variety of possible data analysis commands which may be performed by the trusted nodes and the public nodes of a distributed files system. The trusted nodes may perform all operations listed. The public nodes may perform the random hash operation, the order preserving hash operations, and the Homomorphic encryption operations.

| Type of data analysis command | Unencrypted data | Random hash | Order preserving hash | Homomorphic encryption |
| --- | --- | --- | --- | --- |
| Equality check | yes | yes | yes | Yes |
| Order comparison (> >= < <=) | yes | no | yes | Yes |
| min, max | yes | no | yes | Yes |
| Arithmetic operations | yes | no | no | Yes |
| Regular expression check | yes | no | no | No |
| Format check | yes | no | no | No |
| Inferred format | yes | no | no | No |
| Outlier detection | yes | no | no | No |
| Apply transformation functions | yes | no | no | No |
| Count operations (cardinality, number of distinct values, number of occurrences, etc . . . ) | yes | yes | yes | Yes |
| sort | yes | no | yes | Yes |
| Find primary key columns (simple or compound) | yes | yes | yes | Yes |
| Inclusion/functional dependency | yes | yes | yes | Yes |
| Find duplicate rows (strict) | yes | yes | yes | Yes |
| Find duplicate rows (fuzzy) | yes | no | no | No |

It is understood that one or more of the aforementioned examples of the invention and/or examples as described herein may be combined as long as the combinations are not mutually exclusive.

What is claimed is:

1. A data processing system comprising an application server, the application server comprising at least one application server processor, the application server further comprising a memory for storing machine executable instructions, execution of the instructions causing the at least one application server processor to:
   receive an analysis request, the analysis request comprising multiple data analysis commands for generating an analysis report descriptive of a structured data file;
   determine whether the multiple data analysis commands comprise unencrypted data commands and encrypted data commands;
   receive a public system load message from a public distributed file system, wherein the public system load message comprises a public load capacity of the public distributed file system to determine whether the public distributed file system is capable of executing the multiple data analysis commands for generating the analysis report descriptive of a structured data file;
   receive a trusted system load message from a trusted distributed file system, wherein the trusted system load message comprises a trusted load capacity of the trusted distributed file system to determine whether the trusted distributed file system is capable of executing the multiple data analysis commands for generating the analysis report descriptive of a structured data file;
   in response to the determination of the multiple data analysis commands, the received trusted public system load message, and the received trusted system load message, divide the multiple data analysis commands into private analysis commands and public analysis commands, wherein the private analysis commands comprise unencrypted data commands, and wherein the public analysis commands comprise encrypted data commands;
   send the private analysis commands to the trusted distributed file system;
   send a portion of the public analysis commands to the public distributed file system;
   send a remainder of the public analysis commands to the trusted distributed file system, the remainder comprising the public analysis commands not in the portion;
   receive public analysis results from the public distributed file system;
   receive trusted analysis results from the trusted distributed file system; and
   generate the analysis report using the public analysis results and the trusted analysis results.

2. The data processing system of claim 1, wherein the public distributed file system comprises an anonymized copy of the structured data, the structured data file comprises data elements, and the anonymized copy comprises a copy of the structured data files with an anonymizing function applied to at least a subset of the data elements.

3. The data processing system of claim 2, wherein execution of the instruction further comprises causing the at least one application server processor to select the subset of the data elements using at least one of a mask, a classification of the data element, a predetermined criteria, and combinations thereof.

4. The data processing system of claim 2, the anonymizing function being any one of the following: a hash function, a public/private key pair encryption algorithm, a symmetric encryption algorithm, an order preserving hash function, a dictionary index, and a homomorphic encryption algorithm.

5. The data processing system of claim 4, execution of the instructions further causing the at least one application server processor to create the anonymized copy by applying the anonymizing function to at least a subset of the data elements, and execution of the instructions further causing the at least one application server processor to send the anonymized copy of the structured data filed to the public distributed file system.

6. The data processing system of claim 1, execution of the instructions further causing the at least one application server processor to consolidate the public analysis results and the trusted analysis results before generating the analysis report.

7. The data processing system of claim 6, the public analysis results comprising anonymized report data elements, execution of the instructions further causing the at least one application server processor to reverse anonymization of the anonymized report data elements before generating the analysis report.

8. The data processing system of claim 1, the private analysis commands comprising any one of the following: a determination of minimum value, a determination of maximum value, an order comparison, a arithmetic operation, a regular expression check, a format check, an inferred data type check, an outlier detection, a transformation function, a sorting operation, an equality check, an order comparison, a determination of cardinality, a determination of a number of distinct values, a determination of a number of occurrences, a counting operation, a sorting operation, a find primary key column operation both simple and compound, a find duplicate rows operation, a strict find duplicate rows operation, a fuzzy find duplicate rows operation, and combinations thereof.

9. The data processing system of claim 1, the public analysis commands comprising any one of the following: an equality check, an order comparison, a determination of cardinality, a number of distinct values, a number of occurrences, a counting operation, a sorting operation, a find primary key column operation both simple and compound, a find duplicate rows operation, a strict find duplicate rows operation, a fuzzy find duplicate rows operation, and combinations thereof.

10. The data processing system of claim 1, the data processing system further comprising the trusted distributed file system and the public distributed file system.

11. The data processing system of claim 1, further comprising:
   the analysis request being a metadata analysis request, and the analysis report being a metadata profile; and
   the analysis request being descriptive of data elements matching at least a predetermined criterion.

12. The data processing system of claim 1, the instructions further causing the at least one application server processor to divide the multiple data analysis commands into the private analysis command and public analysis commands by:
   determining locations in the structured data elements specified by each of the private analysis command and the public analysis commands, the locations determining if a data element associated with the structures data elements is anonymized in the public distributed file system;
   assigning a data analysis command to the public analysis commands if the location of the data analysis command indicates that the data analysis element is not anonymized;

assigning the data analysis command to the public analysis commands if the location of the data analysis command indicated that a data analysis element is anonymized and the data analysis command is able to analyze anonymized data; and assigning the data analysis command to the private analysis commands if the location of the data analysis commands indicate the data element is anonymized and the data analysis command is unable to analyze the anonymized data.

13. A method of operating a data processing system comprising an application server, the application server comprising at least one application server processor, the application server further comprising a memory for storing machine executable instructions, the method comprising the following steps performed by the at least one application server processor:

receiving an analysis request, the analysis request comprising multiple data analysis commands for generating an analysis report descriptive of a structured data file;

determining whether the multiple data analysis commands comprise unencrypted data commands and encrypted data commands;

receiving a public system load message from a public distributed file system, wherein the public system load message comprises a public load capacity of the public distributed file system to determine whether the public distributed file system is capable of executing the multiple data analysis commands for generating the analysis report descriptive of a structured data file;

receiving a trusted system load message from a trusted distributed file system, wherein the trusted system load message comprises a trusted load capacity of the trusted distributed file system to determine whether the trusted distributed file system is capable of executing the multiple data analysis commands for generating the analysis report descriptive of a structured data file;

in response to the determination of the multiple data analysis commands, the received trusted public system load message, and the received trusted system load message, dividing the multiple data analysis commands into private analysis commands and public analysis commands, wherein the private analysis commands comprise unencrypted data commands, and wherein the public analysis commands comprise encrypted data commands;

sending the private analysis commands to the trusted distributed file system;

sending a portion of the public analysis commands to the public distributed file system;

sending a remainder of the public analysis commands to the trusted distributed file system, the remainder comprising the public analysis commands not in the portion;

receiving public analysis results from the public distributed file system;

receiving trusted analysis results from the trusted distributed file system; and generating the analysis report using the public analysis results and the trusted analysis results.

14. The method of claim 13, the public distributed file system containing an anonymized copy of the structured data, the structured data file comprising data elements, the anonymized copy being a copy of the structured data files with an anonymizing function applied to at least a subset of the data elements.

15. The method of claim 14, execution of the instruction further causing the at least one application server processor to select the subset of the data elements using any one of the following: a mask, a classification of the data element, a predetermined criteria, and combinations thereof.

16. The method of claim 14, the anonymizing function being any one of the following: a hash function, a public/private key pair encryption algorithm, a symmetric encryption algorithm, an order preserving hash function, a dictionary index, and a homomorphic encryption algorithm.

17. The method of claim 16, execution of the instructions further causing the at least one application server processor to create the anonymized copy by applying the anonymizing function to at least a subset of the data elements, and execution of the instructions further causing the at least one application server processor to send the anonymized copy of the structured data filed to the public distributed file system.

18. The method of claim 13, execution of the instructions further causing the at least one application server processor to consolidate the public analysis results and the trusted analysis results before generating the analysis report.

19. A computer readable storage medium containing instructions for execution by at least one application server processor of an application server, execution of the instructions causing the application server processor to:

receive an analysis request, the analysis request comprising multiple data analysis commands for generating an analysis report descriptive of a structured data file;

determine whether the multiple data analysis commands comprise unencrypted data commands and encrypted data commands;

receive a public system load message from a public distributed file system, wherein the public system load message comprises a public load capacity of the public distributed file system to determine whether the public distributed file system is capable of executing the multiple data analysis commands for generating the analysis report descriptive of a structured data file;

receive a trusted system load message from a trusted distributed file system, wherein the trusted system load message comprises a trusted load capacity of the trusted distributed file system to determine whether the trusted distributed file system is capable of executing the multiple data analysis commands for generating the analysis report descriptive of a structured data file;

in response to the determination of the multiple data analysis commands, the received trusted public system load message, and the received trusted system load message, divide the multiple data analysis commands into private analysis commands and public analysis commands, wherein the private analysis commands comprise unencrypted data commands, and wherein the public analysis commands comprise encrypted data commands;

send the private analysis commands to the trusted distributed file system;

send a portion of the public analysis commands to the public distributed file system;

send a remainder of the public analysis commands to the trusted distributed file system, the remainder comprising the public analysis commands not in the portion;

receive public analysis results from the public distributed file system;

receive trusted analysis results from the trusted distributed file system; and generate the analysis report using the public analysis results and the trusted analysis results.

\* \* \* \* \*